(12) United States Patent
Yoshino (10) Patent No.: US 12,047,539 B2
(45) Date of Patent: Jul. 23, 2024

(54) METHOD AND SYSTEM FOR CABLE MANAGEMENT WITHIN HINGE MECHANISMS OF ROTATING UNITS IN AN IMAGE READING APPARATUS AND PRINTING APPARATUS

(71) Applicant: CANON KABUSHIKI KAISHA, Tokyo (JP)

(72) Inventor: Hiroshi Yoshino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/491,667

(22) Filed: Oct. 20, 2023

(65) Prior Publication Data

US 2024/0137449 A1 Apr. 25, 2024

(30) Foreign Application Priority Data

Oct. 25, 2022 (JP) ................. 2022-170973

(51) Int. Cl.
*H04N 1/00* (2006.01)
*B41J 29/13* (2006.01)
(52) U.S. Cl.
CPC .......... *H04N 1/00557* (2013.01); *B41J 29/13* (2013.01); *H04N 1/00535* (2013.01); *H04N 1/00554* (2013.01); *H04N 1/00559* (2013.01); *H04N 1/00795* (2013.01)
(58) Field of Classification Search
None
See application file for complete search history.

(56) References Cited

U.S. PATENT DOCUMENTS

| 2013/0255989 A1* | 10/2013 | Ito ............................ B41J 29/02 |
| | | 174/60 |
| 2014/0211270 A1* | 7/2014 | Yamasaki ................ H04N 1/03 |
| | | 358/474 |
| 2019/0364163 A1* | 11/2019 | Nakayama ......... H04N 1/00572 |
| 2020/0036848 A1* | 1/2020 | Harada .............. H04N 1/00557 |

FOREIGN PATENT DOCUMENTS

JP 2013205755 A 10/2013

* cited by examiner

*Primary Examiner* — Henok Shiferaw
(74) *Attorney, Agent, or Firm* — Canon U.S.A., Inc. IP Division (57) ABSTRACT

An image reading device includes a first image reading unit to read an image of a medium placed on a placement portion, a cover unit, and a hinge portion. The cover unit is rotatable in a first direction from a first position to cover the placement portion toward a second position and in a second direction from the second position toward the first position. The hinge portion has a first opening provided on a placement portion side, a second opening provided on a cover unit side, a first space in which a first cable extending from the first opening toward the second opening is disposed, and a second space that is adjacent to the first space via a partition portion and in which a second cable extending from the first opening toward the second opening is disposed. The first space extends in the first direction near the first opening.

15 Claims, 11 Drawing Sheets

METHOD AND SYSTEM FOR CABLE MANAGEMENT WITHIN HINGE MECHANISMS OF ROTATING UNITS IN AN IMAGE READING APPARATUS AND PRINTING APPARATUS

BACKGROUND

Field

The present disclosure relates to an image reading device and a printing apparatus.

Description of the Related Art

Conventionally, there is known an image reading device in which an image reading unit that reads an image of a printing medium is rotatably attached to an apparatus main body. In this configuration, the image reading unit and the apparatus main body are electrically connected to each other by a cable. Japanese Patent Laid-Open No. 2013-205755 discloses a configuration in which a plurality of flat cables is individually wired through wiring paths partitioned by partition wall portions.

SUMMARY

According to an aspect of the present disclosure, an image reading device includes a first image reading unit configured to read an image of a medium placed on a placement portion, a cover unit rotatable in a first direction from a first position to cover the placement portion toward a second position to expose the placement portion and in a second direction from the second position toward the first position, and a hinge portion configured to connect the first image reading unit and the cover unit to each other and to support the cover unit rotatably about a rotational center, wherein the hinge portion has a first opening provided on a placement portion side, a second opening provided on a cover unit side, a first space in which a first cable extending from the first opening toward the second opening is disposed, and a second space that is adjacent to the first space via a partition portion and in which a second cable extending from the first opening toward the second opening is disposed, and wherein the first space extends in the first direction in a vicinity of the first opening.

Further features of the present disclosure will become apparent from the following description of exemplary embodiments with reference to the attached drawings.

DESCRIPTION OF THE EMBODIMENTS

First Embodiment

Hereinafter, an exemplary embodiment of a printing apparatus will be described in detail with reference to the accompanying drawings. The following embodiment does not limit the present disclosure, and all combinations of characteristics described in the present embodiment are not necessarily essential to the solution of the present disclosure. In addition, the positions, shapes, and the like of constituent elements described in the embodiment are merely examples, and are not intended to limit the scope of the present disclosure thereto.

In the following description, an inkjet printing apparatus will be used as a printing apparatus according to the present embodiment. The printing apparatus may be an apparatus having only a function of printing an image on a printing medium, or may be a multi-function peripheral having, for example, a function of reading an image. In the following description, a multi-function peripheral having a function of reading an image and being capable of printing an image on a printing medium will be described as an example of the printing apparatus. The type of printing apparatus is not limited to the inkjet printing apparatus, and may be a printing apparatus that performs printing on a printing medium by an electrophotographic system.

Figure 1A:
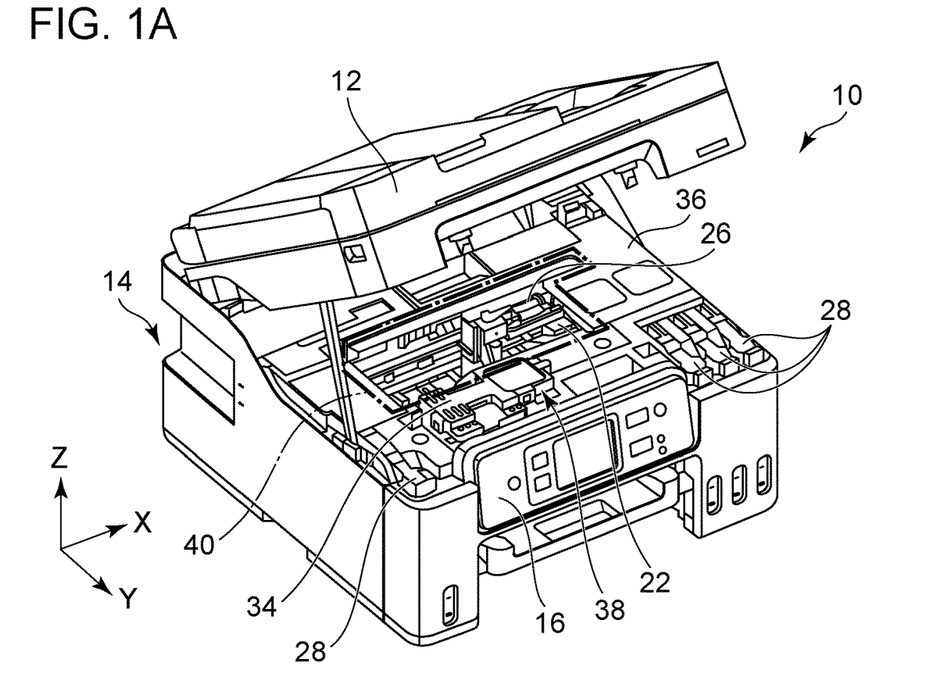
FIGS. 1A and 1B are views illustrating a configuration of a printing apparatus according to a first embodiment.
Figure 1B:
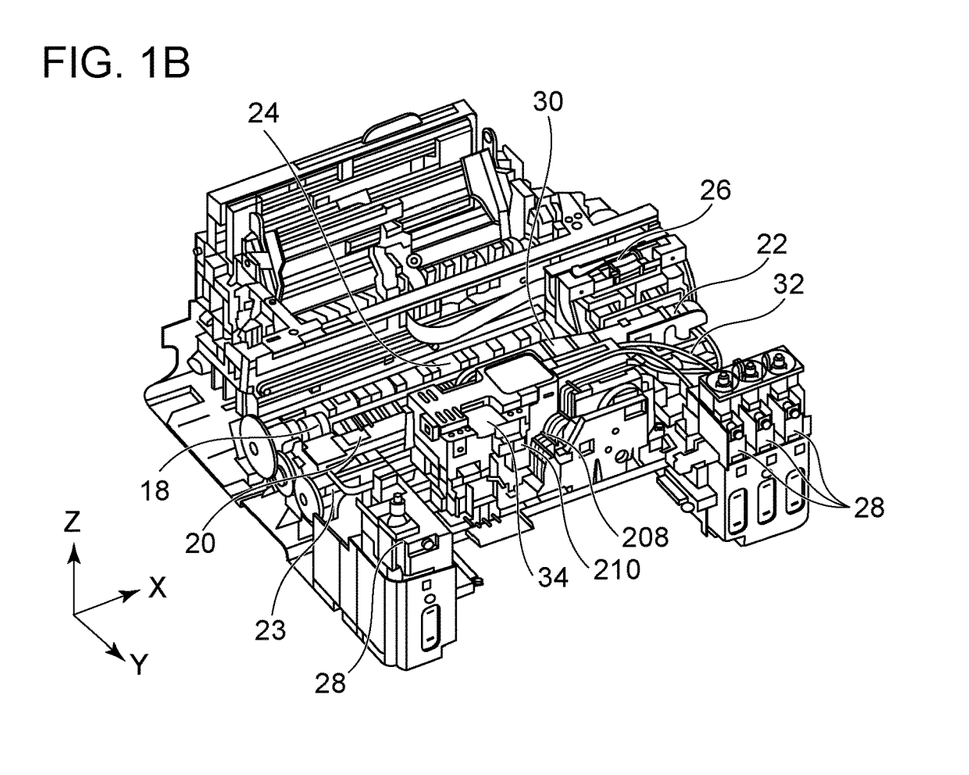

FIGS. 1A and 1B are views illustrating a configuration of a printing apparatus according to the present embodiment. FIG. 1A is a perspective view of the printing apparatus in a state in which a reading unit is opened, and FIG. 1B is a view illustrating a general configuration of a main part of a printing unit.

The directions used in this specification will now be described. In this specification, when an operator directly faces the printing apparatus, a direction from the left side toward the right side of the apparatus is referred to as an X direction, a direction from the far side toward the near side is referred to as a Y direction, and a direction from the lower side toward the upper side is referred to as a Z direction. As described above, the X direction, the Y direction, and the Z direction are directions from one side toward the other side and are represented by adding "+ (plus)" as appropriate, and each direction from the other side toward the one side is represented by adding "− (minus)".

A printing apparatus 10 includes a reading unit 12 that can read an image of a document, a printing unit 14 that can print an image on a printing medium based on image data, and an operation unit 16 to which an instruction from a user is input and that can display various items of information. The reading unit 12 is provided on the upper side of the printing unit 14 so as to be openable and closable. Various known techniques can be used for the configurations of the reading unit 12 and the operation unit 16, and hence the detailed description thereof will be omitted in the following description.

The printing unit 14 includes a conveying roller 18 that conveys a fed printing medium, a platen 20 that supports the printing medium conveyed by the conveying roller 18, and a printing head 22 that performs printing by ejecting ink onto the printing medium supported by the platen 20. In addition, the printing unit 14 includes a discharging roller 23 that discharges the printing medium on which printing has been performed by the printing head 22 to a tray (not illustrated).

The printing unit 14 includes a pinch roller 24 that is pressed against the conveying roller 18 and associated with the conveying roller 18. The printing medium is nipped between the conveying roller 18 and the pinch roller 24 and can be conveyed in the ±Y direction. The printing head 22 is detachably mounted on a carriage 26 provided to be movable in the ±X direction. Thus, in the printing unit 14, the printing head 22 is movable in the ±X direction via the carriage 26. The platen 20 extends in the X direction by a length corresponding to the length in a width direction of a printable printing medium.

When the printing medium is conveyed to a printing start position by the conveying roller 18, the printing unit 14 performs a printing operation of ejecting ink onto the printing medium to perform printing while moving the printing head 22 in the X direction (or the −X direction). Then, a conveying operation of conveying the printing medium in the Y direction by a predetermined amount is performed by the conveying roller 18, an area which has not been printed yet is positioned at a position to face the printing head 22, and the printing operation is performed again. By alternately repetitively executing the printing operation and the conveying operation in this manner, the printing unit 14 performs printing on the printing medium.

The printing unit 14 includes an ink tank 28 that stores ink to be supplied to the printing head 22 on the other side in the Y direction. The ink tank 28 is connected to the printing head 22 via a tube 30, and the ink stored in the ink tank 28 is supplied to the printing head 22 via the tube 30. The printing unit 14 also includes a recovery unit 32 that executes a recovery operation for maintaining and recovering the ink ejection performance of the printing head 22 at an appropriate level at a position to face the printing head 22 at a stand-by position. The stand-by position is a position at which the printing head 22 stands by when printing is not performed, and is, for example, a position in the vicinity of an end portion on the one side in the X direction of a movement region of the printing head 22 including the carriage 26 (hereinafter also simply referred to as a "movement region of the printing head 22"). The printing unit 14 further includes a waste ink tank 34 to which waste ink received by the recovery unit 32 is discharged.

The recovery unit 32 includes a cap (not illustrated) that caps and protects an ejection port surface of the printing head 22 in which ejection ports for ejecting ink are formed, a wiper (not illustrated) that wipes off a sticking substance sticking to the ejection port surface, and a suction pump (not illustrated) that depressurizes the inside of the cap. In the present embodiment, black ink and chromatic color ink are discharged by the printing head 22, and hence the cap includes a cap corresponding to ejection ports for ejecting the black ink and a cap corresponding to ejection ports for ejecting the chromatic color ink.

The suction pump is connected to a discharge tube 208. One end portion of the discharge tube 208 is connected to the suction pump, and the other end portion thereof is connected to the waste ink tank 34 via a connecting portion 210. That is, the recovery unit 32 is connected to the waste ink tank 34 via the discharge tube 208. In the printing unit 14, the waste ink received by the recovery unit 32 due to execution of various recovery operations is discharged to the waste ink tank 34 via the discharge tube 208.

An upper surface of the printing unit 14 is formed by a cover member 36 (see FIG. 1A). Thus, in the printing apparatus 10, the cover member 36 is exposed to the outside when the reading unit 12 is opened. The cover member 36 has formed therein an opening 40 through which part of the movement region of the printing head 22 and a housing portion 38 that houses the waste ink tank 34 are exposed. In the opening 40, a portion through which the part of the movement region of the printing head 22 is exposed has a size that allows, for example, when jamming (paper-jamming) occurs, a user to insert his/her hand into, for example, the movement region of the printing head 22 and remove the printing medium. In addition, in the opening 40, a portion through which the housing portion 38 is exposed has a size that allows the waste ink tank 34 to be inserted into the housing portion 38 in the −Z direction (gravitational direction). The housing portion 38 is positioned on the other side in the Y direction of the movement region of the printing head 22 and on the one side in the X direction of the movement region. Thus, in the printing apparatus 10, when the reading unit 12 is opened, the waste ink tank 34 is positioned on the near side with respect to the movement region of the printing head 22, and an operator such as a user or a repair person can easily execute replacement of the waste ink tank 34.

Figure 2A:
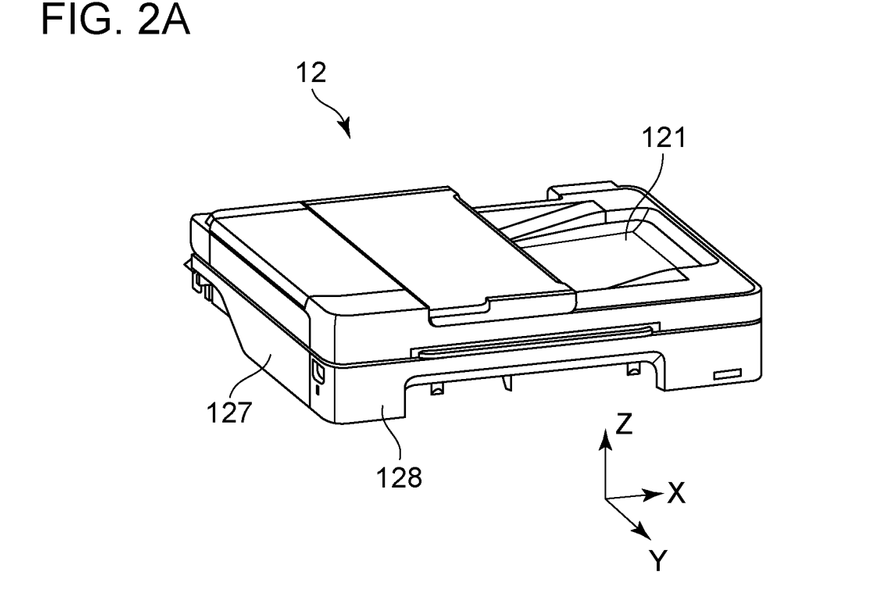
FIGS. 2A and 2B are views illustrating a configuration of a reading unit according to the first embodiment.
Figure 2B:
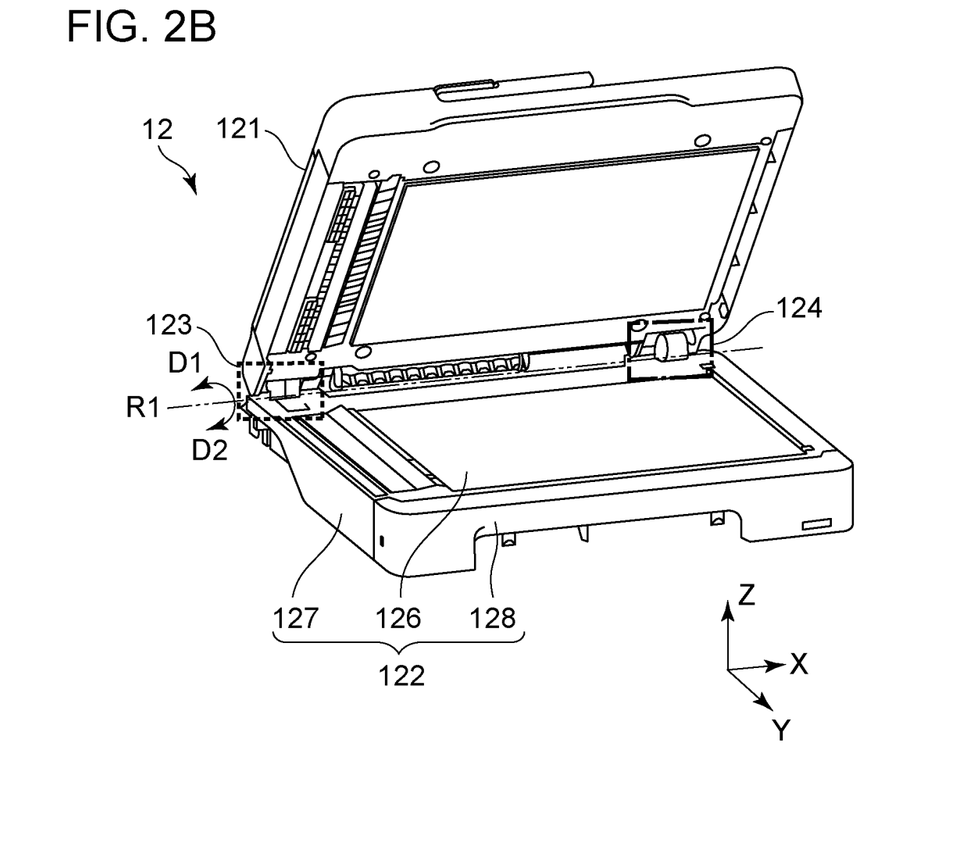
Figure 3:
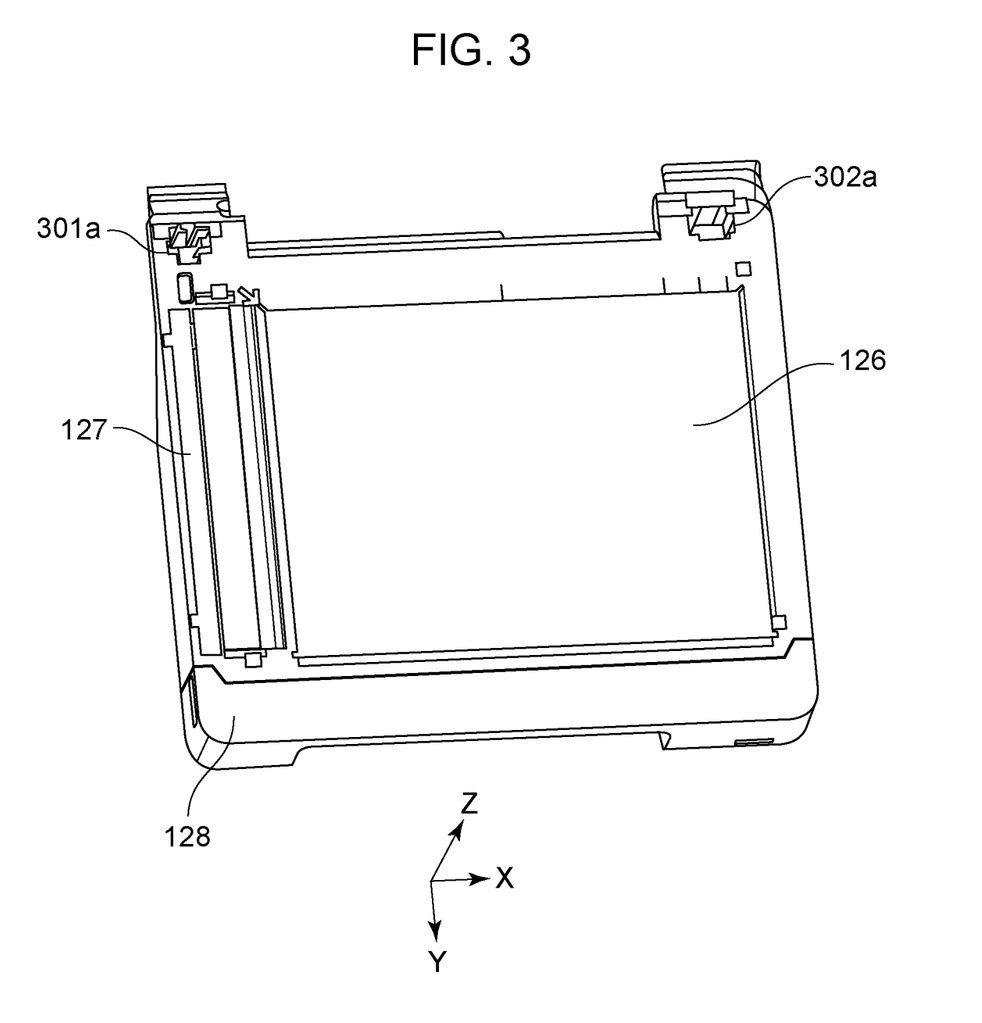
FIG. 3 is a top view of a scanner unit according to the first embodiment.
Figure 4:
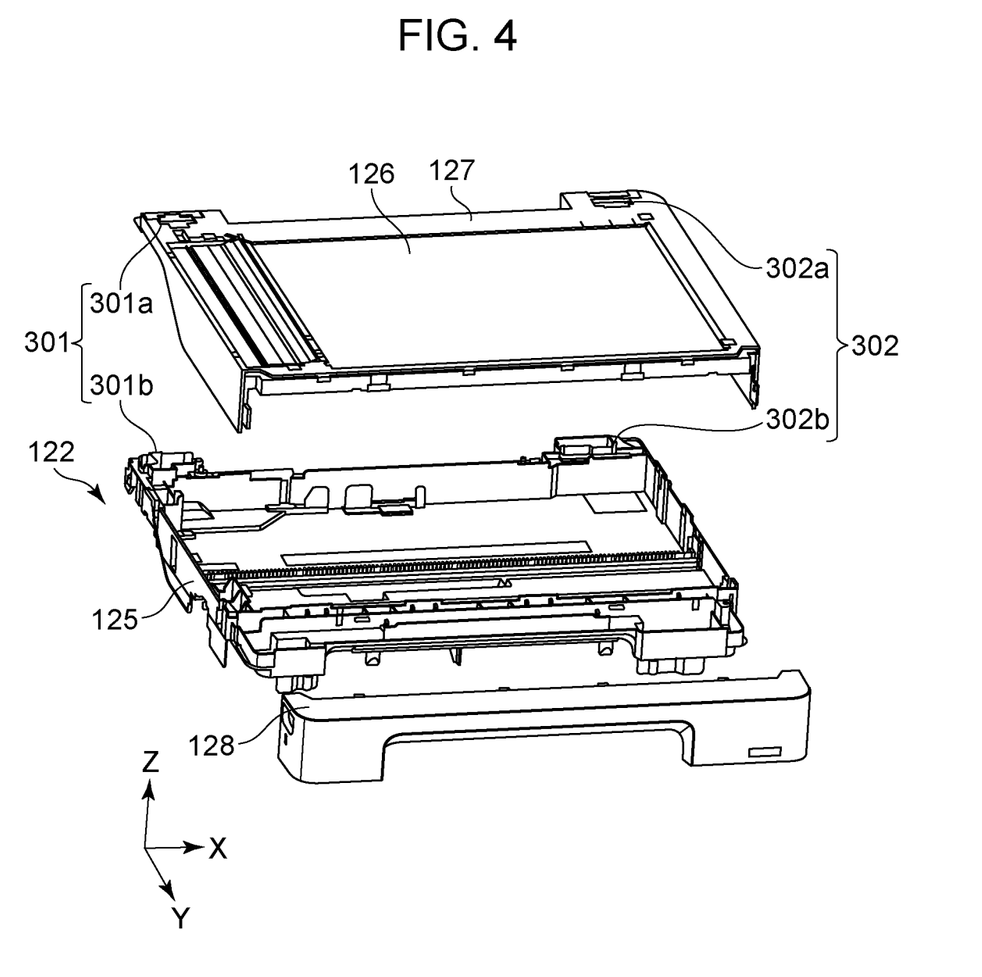
FIG. 4 is an exploded perspective view of the scanner unit according to the first embodiment.

Hereinafter, a configuration of the reading unit 12 will be described with reference to FIGS. 2A to 4. FIGS. 2A and 2B are views illustrating the configuration of the reading unit 12, FIG. 3 is a top view of a scanner unit 122, and FIG. 4 is an exploded perspective view of the scanner unit 122. In the present embodiment, the reading unit 12 includes an automatic document feeder (ADF) unit 121 including a document conveying mechanism (not illustrated) and the scanner unit 122 that reads image data or the like of a document. The scanner unit 122 includes a scanner base 125, a frame portion 127 including a document table 126 as a placement portion on which a document can be placed, and a front cover 128. The ADF unit 121 includes a reading sensor (not illustrated) that reads image data of a document conveyed by the document conveying mechanism, and the scanner unit 122 similarly includes a reading sensor (not illustrated) that reads image data of a document placed on the document table 126. The ADF unit 121 and the scanner unit 122 are connected to each other by a hinge mechanism 123 and a hinge mechanism 124.

Figure 6A:
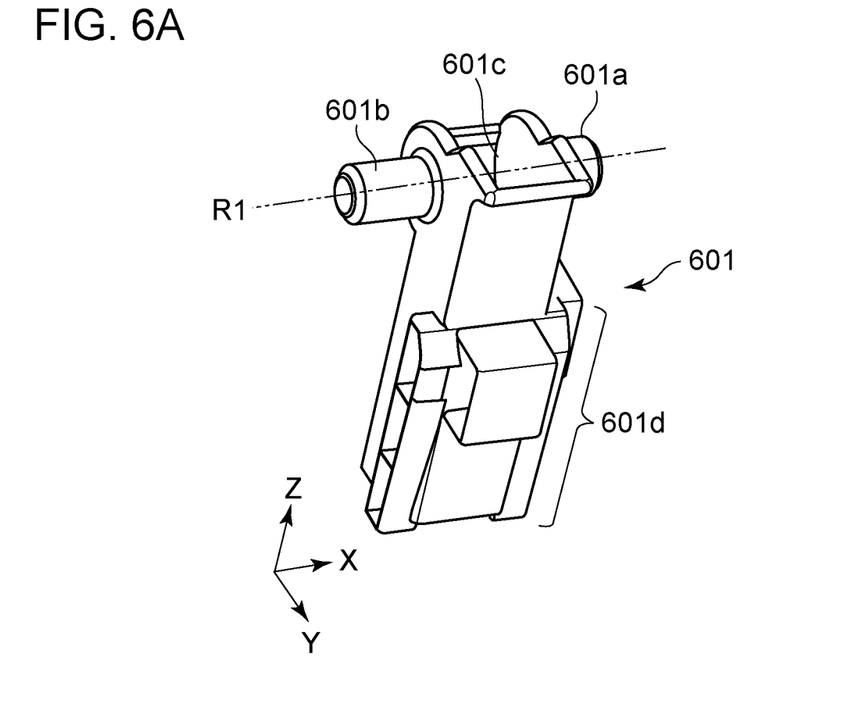
FIGS. 6A and 6B are perspective views illustrating configurations of hinges according to the first embodiment.
Figure 6B:
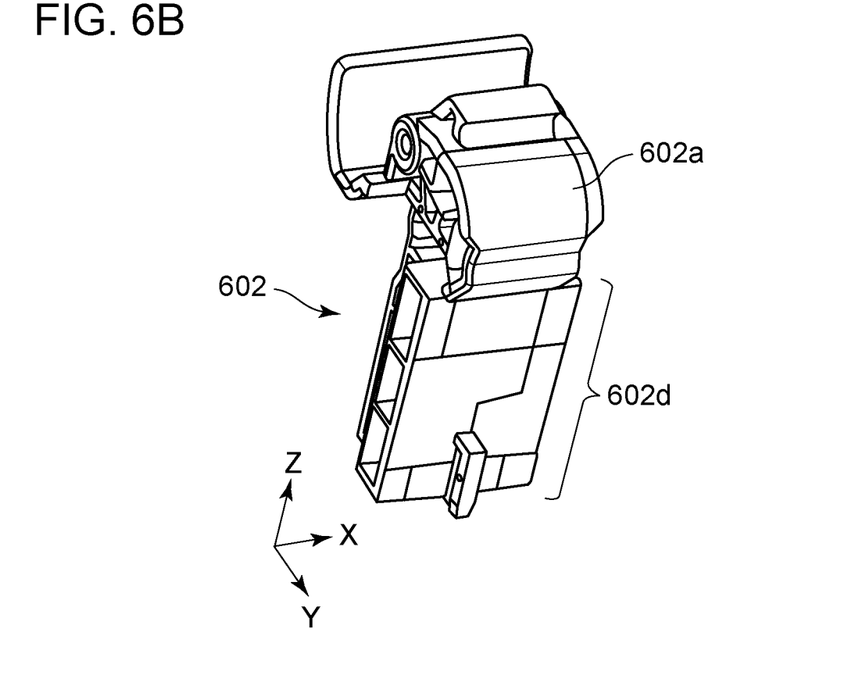

The hinge mechanisms 123 and 124 are mechanisms that connect the ADF unit 121 and the scanner unit 122 to each other by a hinge 601 and a hinge 602 (see FIGS. 6A and 6B). The scanner unit 122 has hinge attachment portions 301 and 302 to which the hinges 601 and 602 can be attached, and the ADF unit 121 is also provided with hinge attachment portions (not illustrated) to which the hinges 601 and 602 can be attached. The hinge attachment portion 301 includes a hole portion 301a provided in the frame portion 127 and a recessed portion 301b provided in the scanner base 125. The hinge attachment portion 302 includes a hole portion 302a provided in the frame portion 127 and a recessed portion 302b provided in the scanner base 125. The ADF unit 121 is held by the hinge mechanisms 123 and 124 rotatably about a rotational center R1 with respect to the scanner unit 122. Specifically, the ADF unit 121 is held rotatably in a D1 direction in which the ADF unit 121 rotates from a closed position (see FIG. 2A) to an open position (see FIG. 2B), and in a D2 direction in which the ADF unit 121 rotates from the open position to the closed position. When the ADF unit 121 is at the closed position, the document table 126 is covered with the ADF unit 121, and when the ADF unit 121 is at the open position, the document table 126 is in an exposed state. Thus, the ADF unit 121 according to the present embodiment also has a function as a cover unit that covers the document table 126.

Figure 5A:
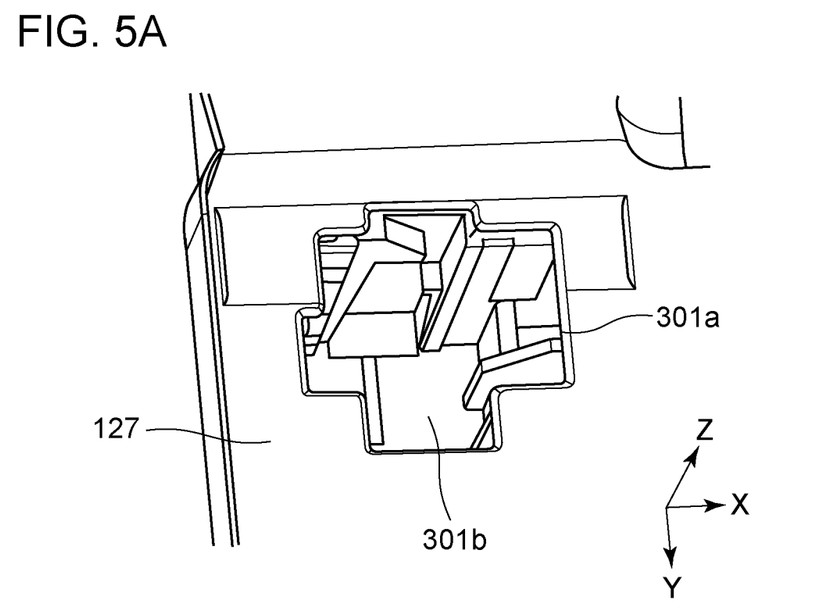
FIGS. 5A and 5B are enlarged views of hinge attachment portions according to the first embodiment.
Figure 5B:
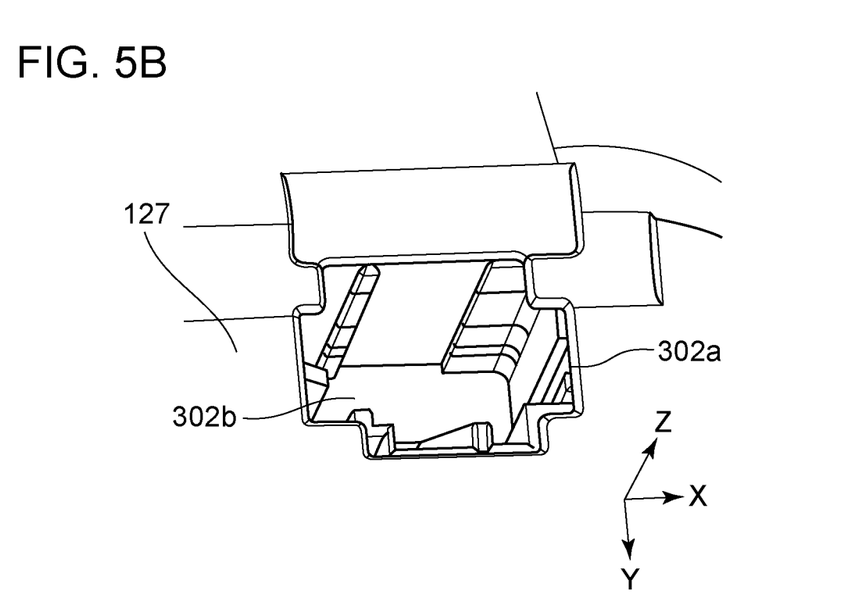

FIGS. 5A and 5B are enlarged views of the hinge attachment portions to which the hinges can be attached in the scanner unit 122. FIG. 5A is an enlarged view of the hinge attachment portion 301, and FIG. 5B is an enlarged view of the hinge attachment portion 302. FIGS. 6A and 6B are perspective views illustrating configurations of the hinge 601 and the hinge 602. In the present embodiment, the hinge 601 is attached to the hinge attachment portion 301, and the hinge 602 is attached to the hinge attachment portion 302. A space 601c that opens upward and downward in the Z direction is provided inside the hinge 601, and cables and the like can be disposed in the space 601c (described later). The hinge 601 includes shaft portions 601a and 601b that define the rotational center R1 of the ADF unit 121. The shaft portions 601a and 601b are attached to the hole portion 301a on the ADF unit 121 side, and a fitting portion 601d is fitted to the recessed portion 301b. The fitting between the hinge attachment portion 301 and the fitting portion 601d is performed in a manner that the movement of the hinge 601 in the X direction and the Y direction is restricted, but the fitting is in a state in which the movement of the hinge 601 in the Z direction is not restricted. Thus, even when the thickness of a document placed on the document table 126 is large, the ADF unit 121 can be moved to the closed position by the hinge 601 being displaced (elevating or lowering) in the Z direction.

The hinge 602 has an urging receiving portion 602a that is urged by an urging member (not illustrated) provided in one or both of the ADF unit 121 and the scanner unit 122.

The hinge 602 has a function of stopping the ADF unit 121 at any position between the open position and the closed position by the urging receiving portion 602a being urged as described above in a state in which the fitting portion 602d and the hinge attachment portion 302 are fitted to each other.

Figure 7:
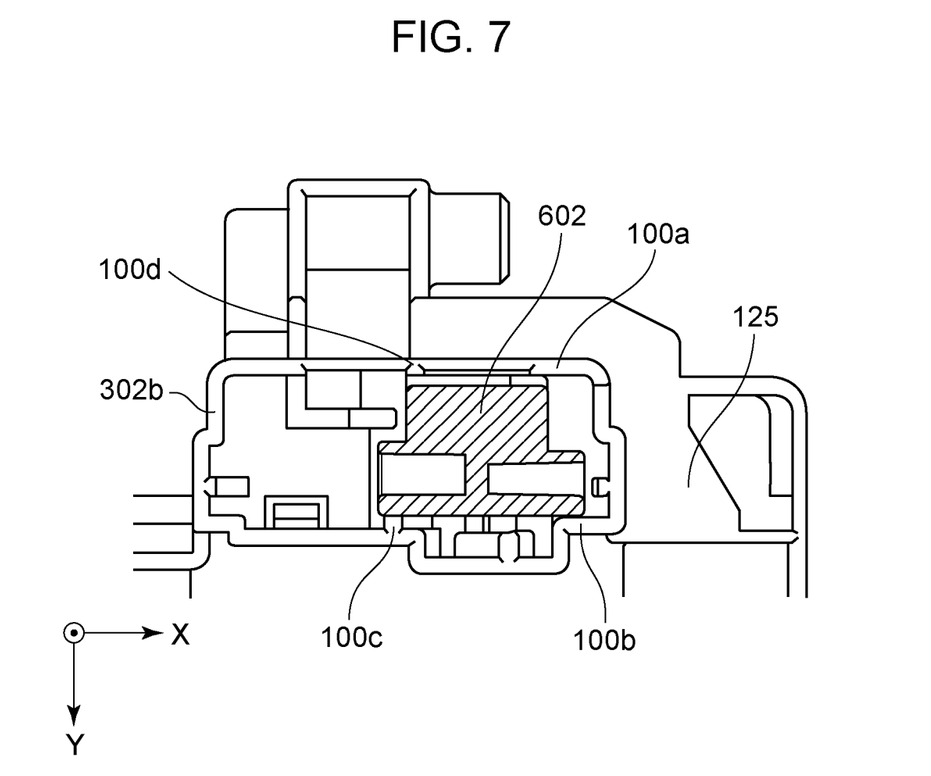
FIG. 7 is a schematic top view illustrating a state in which the hinge is positioned with respect to a recessed portion of the hinge attachment portion according to the first embodiment.

FIG. 7 is a schematic top view illustrating a state in which the hinge 602 is positioned with respect to the recessed portion 302b of the hinge attachment portion 302. When the hinge 602 is attached to the recessed portion 302b, the hinge 602 is positioned in the Y direction by positioning portions 100a, 100b, 100c, and 100d. As described above, the hinge 602 has a function of stopping the ADF unit 121 at any position between the open position and the closed position. Thus, when the ADF unit 121 is stopped at a position other than the open position and the closed position, the load of the ADF unit 121 is applied to the positioning portions 100a to 100d via the hinge 602. In the present embodiment, in particular, the positioning portions 100a and 100b are formed integrally with a side portion of the scanner base 125, and hence the rigidity of the positioning portions is increased so that the positioning portions can withstand the above-described load.

Figures 8A, 8B:
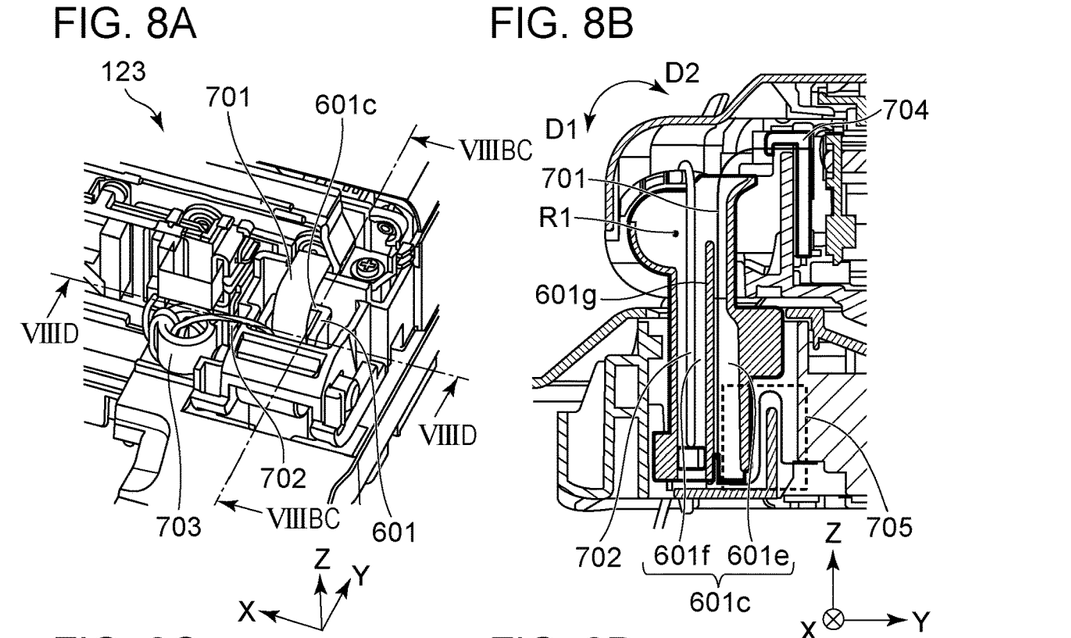
FIGS. 8A to 8D are views illustrating details of a hinge mechanism according to the first embodiment.
Figure 8C:
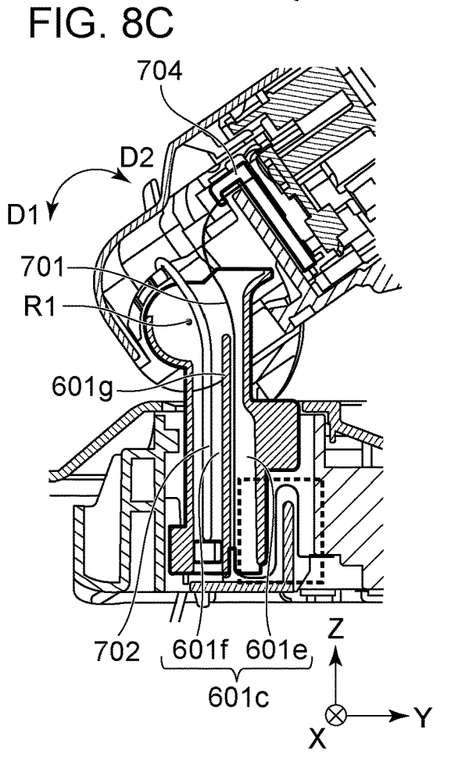
Figure 8D:
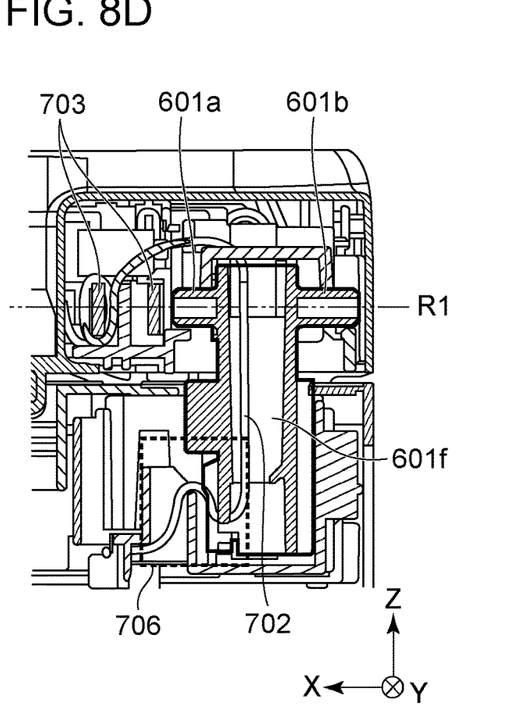

FIGS. 8A to 8D are views illustrating details of the hinge mechanism 123 according to the present embodiment. FIG. 8A is a perspective view when the hinge mechanism 123 is viewed from the rear surface (−Y direction) side of the printing apparatus 10, and FIGS. 8B and 8C are sectional views when a section taken along line VIIIBC-VIIIBC in FIG. 8A is viewed in the −X direction. FIG. 8D is a sectional view when a section taken along line VIIID-VIIID in FIG. 8A is viewed in the −Y direction. As described above, the hinge mechanism 123 is a mechanism in which the hinge 601 connects the ADF unit 121 and the scanner unit 122 to each other, and a flat cable 701 and a motor cable 702 are disposed in the space 601c inside the hinge 601. The flat cable 701 is a cable that transmits a signal from the reading sensor provided in the ADF unit 121 to the printing apparatus 10, and the motor cable 702 functions as a path of a signal for driving the document conveying mechanism. In the ADF unit 121, a ferrite core 703 for stabilizing the electric characteristics of the motor cable 702 is provided in the vicinity of the hinge 601.

The flat cable 701 and the motor cable 702 are partially moved due to the rotation of the ADF unit 121 between the closed position illustrated in FIG. 8B and the open position illustrated in FIG. 8C. It is desirable that the flat cable 701 and the motor cable 702 are disposed to be separated from each other in order to prevent the cables from coming close to or coming into contact with each other due to the movement and causing electrical interference with each other. In the present embodiment, a partition portion 601g is provided inside the hinge 601, and the space 601c is divided into two spaces of a space 601e on the front side and a space 601f on the rear side in the Y direction. The flat cable 701 is disposed in the space 601e, and the motor cable 702 is disposed in the space 601f.

The flat cable 701 is disposed from an upper end and a lower end of the space 601e in the Y direction of the printing apparatus 10, and an upper end side of the flat cable 701 is retained by a retaining portion 704 provided in the ADF unit 121. The motor cable 702 has a structure disposed from an upper end and a lower end of the space 601f in the X direction of the printing apparatus 10, and an upper end side of the motor cable 702 is retained by the ferrite core 703. By making the directions in which the cables extend from an upper end and a lower end of the space 601c different from each other in this way, the cables are separated from each other. Alternatively, the upper end of the motor cable 702 may be retained by a retaining unit other than the ferrite core.

Further, an upper portion of the space 601c in the hinge 601 is a space extending in the −Y direction. When the ADF unit 121 is rotated in the D1 direction, the upper end of the flat cable 701 moves in the D1 direction together with the retaining portion 704, but the movement is restricted by the partition portion 601g. Similarly, the motor cable 702 moves in the D1 direction together with the ferrite core 703. At this time, the flat cable 701 and the motor cable 702 move in the −Y direction in the hinge 601 as a whole. The space of the upper portion of the space 601c extends in the −Y direction or the D1 direction so as to secure a movement region of the upper end of each cable that moves due to the rotation of the ADF unit 121. That is, the space 601e and the space 601f are joined with each other in the upper portion in the hinge 601, and the partition portion 601g is not provided in the vicinity of the rotational center R1.

Thus, it is possible to allow the upper ends of the flat cable 701 and the motor cable 702 to move in the D1 direction. With these configurations, the upper ends of the flat cable 701 and the motor cable 702 are allowed to move while the flat cable 701 and the motor cable 702 are separated from each other by the partition portion 601g. Thus, even when the ADF unit 121 is rotated, the flat cable 701 and the motor cable 702 can be prevented from coming close to or coming into contact with each other.

Lower end sides of the flat cable 701 and the motor cable 702 are disposed in different directions as described above. The flat cable 701 is folded in a crank shape by a folding portion 705, and the motor cable 702 is folded in a crank shape by a folding portion 706. With the folding portions 705 and 706, the respective cables are fixed to the printing apparatus 10 while having margins in the Z direction. Although the hinge 601 moves in the Z direction in accordance with the thickness of the document placed on the document table 126, with the above-described configuration, the respective cables can follow the movement of the hinge 601 without being stretched because the cables are in states with the margins in the Z direction by the folding portions 705 and 706. In addition, the folding portion 705 provides the folding in the Y direction and the folding portion 706 provides the folding in the X direction, and hence it is possible to maintain the distance between the flat cable 701 and the motor cable 702 while providing margins for wiring in the Z direction. The flat cable 701 is disposed in the hinge 601 without being loosened by the retaining portion 704, the partition portion 601g, and the folding portion 705 described above. Similarly, the motor cable 702 is disposed in the hinge 601 without being loosened by the ferrite core 703, the partition portion 601g, and the folding portion 706 described above.

With the above-described configuration, it is possible to maintain the distance between the cables even though the plurality of cables is disposed inside the hinge 601, and to suppress the looseness and the stretch of the cables due to the rotation of the ADF unit 121, thereby appropriately disposing the cables. Further, in the present embodiment, it is not necessary to provide a member or a space for disposing the cables at positions different from the hinge, and it is possible to downsize the printing apparatus 10.

The partition portion 601g may constitute part of the hinge 601, or may be constituted by a member different from the hinge 601.

Another Embodiment

Another embodiment of the present disclosure will be described. Description of the configuration similar to that of the first embodiment will be omitted.

Figure 9A:
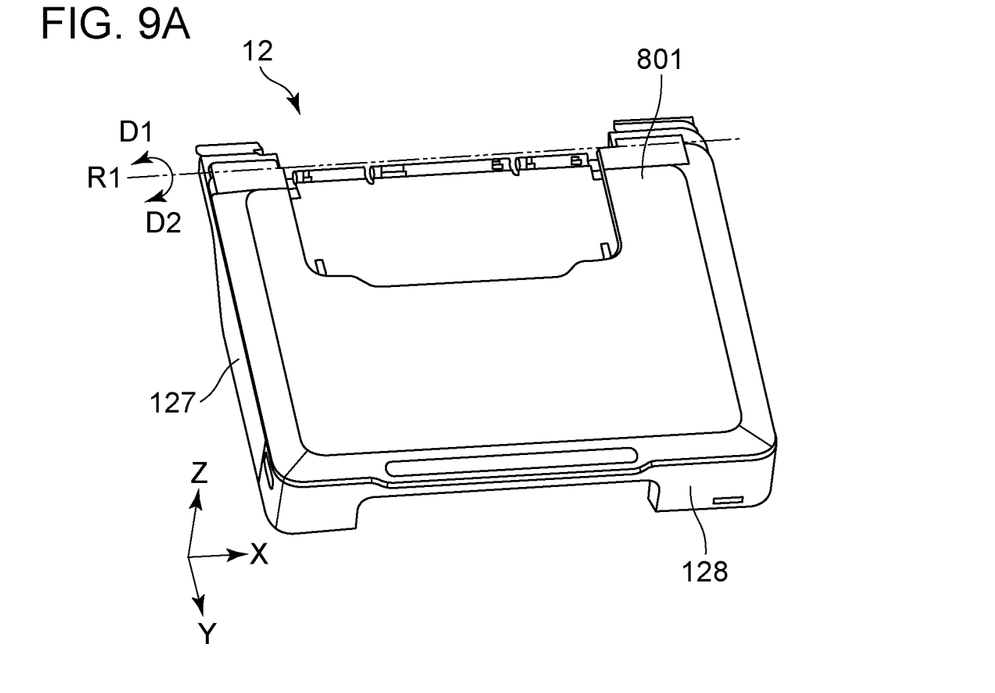
FIGS. 9A and 9B are perspective views illustrating a configuration of a reading unit according to another embodiment.
Figure 9B:
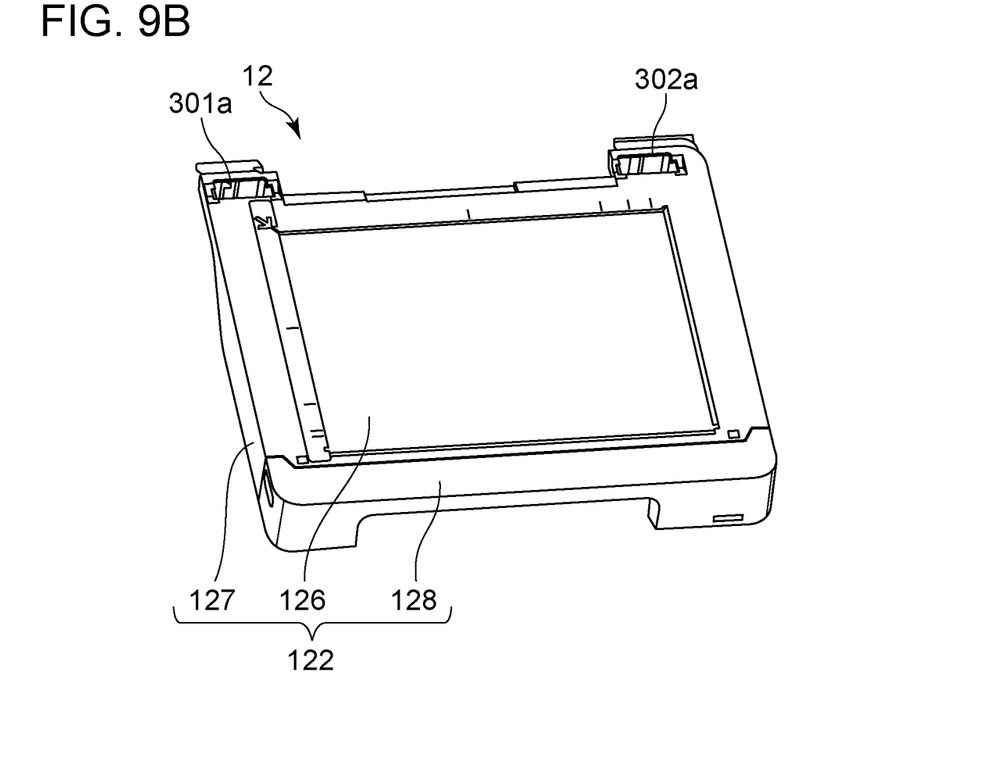
Figure 10:
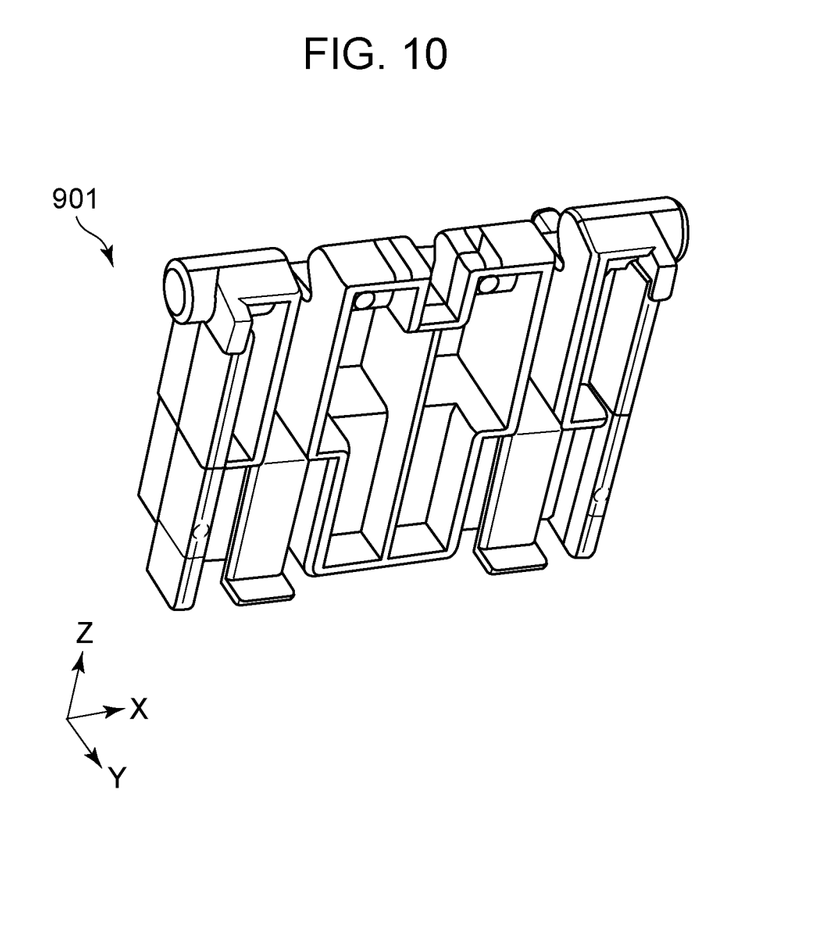
FIG. 10 is a perspective view illustrating a configuration of a hinge according to the other embodiment.

FIGS. 9A and 9B are perspective views illustrating a configuration of a reading unit 12 according to the present embodiment. Although the reading unit 12 includes the ADF unit 121 and the scanner unit 122 in the first embodiment, the reading unit 12 according to the present embodiment does not include the ADF unit 121 but includes a scanner unit 122 and a scanner cover 801. The configuration of the scanner unit 122 according to the present embodiment is similar to that in the first embodiment, but the scanner cover 801 is lighter than the ADF unit 121 because the scanner cover 801 does not include a document conveying mechanism and the like. Thus, the load applied to hinges and hinge attachment portions for rotating the scanner cover 801 with respect to the scanner unit 122 is smaller than that in the first embodiment. In the present embodiment, a hinge 901 (see FIG. 10) having rigidity lower than that of the hinge 601 is attached to a hinge attachment portion 302. Accordingly, the scanner cover 801 is rotatable about a rotational center R1 in an opening direction D1 and a closing direction D2.

Figure 11:
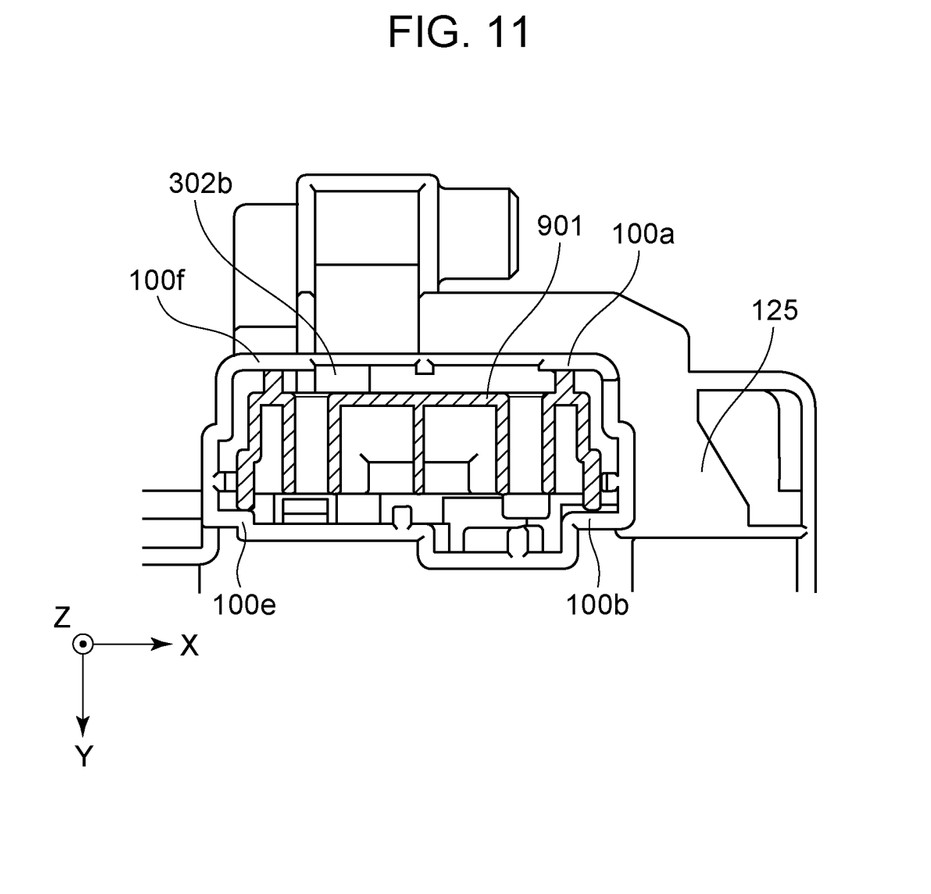
FIG. 11 is a schematic top view illustrating a state in which the hinge is positioned with respect to a recessed portion of a hinge attachment portion according to the other embodiment.

FIG. 11 is a schematic top view illustrating a state in which the hinge 901 is positioned with respect to a recessed portion 302b of the hinge attachment portion 302. The shape of the recessed portion 302b is similar to that in the first embodiment, but in the present embodiment, the position of the hinge 901 in the Y direction is determined by positioning portions 100a, 100b, 100e, and 100f. That is, the recessed portion 302b has the positioning portions 100a to 100f, and a hinge is positioned by an appropriate positioning portion depending on whether the hinge attached to the recessed portion 302b is the hinge 602 or the hinge 901.

Thus, it is also possible to attach the hinge 602 to the recessed portion 302b as in the first embodiment.

With the above-described configuration, it is possible to attach an appropriate hinge to the scanner base 125 having the same configuration regardless of whether the reading unit 12 includes the ADF unit 121 or not.

The configuration according to any one of the embodiments may be used for a mechanism in a case where the scanner unit rotates with respect to the printing unit 14. In addition, in the printing apparatus 10 that does not include the scanner unit, the configuration in any of the embodiments may be used for a mechanism in a case where a cover unit including an electric mechanism such as an operation panel rotates with respect to the main body of the printing apparatus 10.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-170973, filed Oct. 25, 2022, which is hereby incorporated by reference herein in its entirety.

What is claimed is:

1. An image reading device comprising:
a first image reading unit configured to read an image of a medium placed on a placement portion;
a cover unit rotatable in a first direction from a first position to cover the placement portion toward a second position to expose the placement portion and in a second direction from the second position toward the first position; and
a hinge portion configured to connect the first image reading unit and the cover unit to each other and to support the cover unit rotatably about a rotational center,
wherein the hinge portion has a first opening provided on a placement portion side, a second opening provided on a cover unit side, a first space in which a first cable extending from the first opening toward the second opening is disposed, and a second space that is adjacent to the first space via a partition portion and in which a second cable extending from the first opening toward the second opening is disposed, and
wherein the first space extends in the first direction in a vicinity of the second opening.

2. The image reading device according to claim 1, wherein the partition portion is provided from the second opening toward the first opening up to a vicinity of the rotational center and is not provided between the vicinity of the rotational center and the first opening.

3. The image reading device according to claim 1, wherein the cover unit includes a conveyance unit configured to convey a medium, and a second image reading unit configured to read an image of the medium conveyed by the conveyance unit.

4. The image reading device according to claim 1, wherein the partition portion is formed integrally with the hinge portion.

5. The image reading device according to claim 1, wherein an upper end portion of the first cable is retained in the first image reading unit by a first retaining unit provided in the first image reading unit, and an upper end portion of the second cable is retained in the first image reading unit by a second retaining unit provided in the first image reading unit.

6. The image reading device according to claim 5, wherein the first retaining unit retains the upper end portion of the first cable disposed in the first space toward an axial direction of the rotational center, and the second retaining unit retains the upper end portion of the second cable disposed in the second space toward a direction intersecting with the axial direction.

7. The image reading device according to claim 1, wherein the hinge portion is connected in a manner capable of elevating or lowering with respect to the first image reading unit.

8. The image reading device according to claim 1, wherein the first image reading unit includes a first folding portion configured to fold a lower end portion of the first cable in a substantially crank-like shape toward an axial direction of the rotational center, and a second folding unit configured to fold a lower end portion of the second cable in a substantially crank-like shape toward a direction intersecting with the axial direction.

9. The image reading device according to claim 1, wherein the first image reading unit has an attachment portion to which the hinge portion is attached, and the attachment portion includes a positioning portion that positions the hinge portion.

10. The image reading device according to claim 9, wherein the attachment portion allows a first hinge portion having a first shape or a second hinge portion having a second shape different from the first shape to be attached thereto, and the positioning portion is capable of positioning any one of the first hinge portion having the first shape and the second hinge portion having the second shape.

11. The image reading device according to claim 10, wherein the second hinge portion does not have a space in which the first cable and the second cable are disposed.

12. The image reading device according to claim 9, wherein the positioning portion is formed integrally with a side portion of the first image reading unit.

13. A printing apparatus comprising:
a printing unit configured to perform printing on a medium; and
an image reading device,
wherein the image reading device includes:
a first image reading unit configured to read an image of a medium placed on a placement portion,
a cover unit rotatable in a first direction from a first position to cover the placement portion toward a second position to expose the placement portion and in a second direction from the second position toward the first position, and
a hinge portion configured to connect the first image reading unit and the cover unit to each other and to support the cover unit rotatably about a rotational center,
wherein the hinge portion has a first opening provided on a placement portion side, a second opening provided on a cover unit side, a first space in which a first cable extending from the first opening toward the second opening is disposed, and a second space that is adjacent to the first space via a partition portion and in which a second cable extending from the first opening toward the second opening is disposed, and
wherein the first space extends in the first direction in a vicinity of the first opening.

14. A printing apparatus comprising:
a printing unit including a recording head for ejecting liquid on a medium; and
a cover unit rotatable in a first direction from a first position to cover an upper portion of the printing unit toward a second position to expose the upper portion and in a second direction from the second position toward the first position, and
a hinge portion configured to connect the printing unit and the cover unit to each other and to support the cover unit rotatably about a rotational center,
wherein the hinge portion has a first opening provided on a printing unit side, a second opening provided on a cover unit side, a first space in which a first cable extending from the first opening toward the second opening is disposed, and a second space that is adjacent to the first space via a partition portion and in which a second cable extending from the first opening toward the second opening is disposed, and
wherein the first space extends in the first direction in a vicinity of the second opening.

15. The printing apparatus according to claim 14, wherein the cover unit includes an operation panel.

* * * * *